United States Patent [19]

Corbett et al.

[11] Patent Number: 5,799,986
[45] Date of Patent: Sep. 1, 1998

[54] CONNECTOR ASSEMBLY AND METHOD OF MANUFACTURE

[75] Inventors: Christopher H. Corbett, New Philadelphia; Brent A. Balika, Cuyahoga Falls; Bruce H. Moore, Kent; Scott E. Frye, Dover, all of Ohio

[73] Assignee: Flex Technologies, Inc., Midvale, Ohio

[21] Appl. No.: 677,448

[22] Filed: Jul. 2, 1996

Related U.S. Application Data

[63] Continuation-in-part of Ser. No. 361,094, Dec. 21, 1994, abandoned.

[51] Int. Cl.⁶ .................................................. F16L 9/14
[52] U.S. Cl. .................. 285/55; 285/133.2; 285/148.19; 285/179; 285/305; 285/320; 285/331; 285/340; 285/423; 285/906; 285/317
[58] Field of Search ........................... 285/55, 320, 292, 285/331, 906, 317, 305, 133.1, 179, 148.19, 148.21, 133.2, 340, 423

[56] References Cited

U.S. PATENT DOCUMENTS

| | | | |
|---|---|---|---|
| 2,998,269 | 8/1961 | Houghton | 285/260 |
| 3,200,023 | 8/1965 | Cliker | 156/172 |
| 3,558,164 | 1/1971 | Havell | 285/236 |
| 3,948,547 | 4/1976 | Gache | 285/317 |
| 4,244,608 | 1/1981 | Stuemky | 285/305 |
| 4,258,935 | 3/1981 | Rodrigo et al. | 285/21 |
| 4,310,185 | 1/1982 | Bartholomew | 285/369 |
| 4,458,552 | 7/1984 | Spease et al. | 74/501 |
| 4,625,998 | 12/1986 | Draudt et al. | 285/7 |
| 4,681,351 | 7/1987 | Bartholomew | 285/319 |
| 4,763,541 | 8/1988 | Spease | 74/501 |
| 4,800,926 | 1/1989 | Beck | 138/106 |
| 4,934,655 | 6/1990 | Blenkush et al. | 251/149.1 |
| 4,951,524 | 8/1990 | Niskanen | 74/502.4 |
| 5,009,454 | 4/1991 | Bartholomew | 285/24 |
| 5,052,725 | 10/1991 | Meyer et al. | 285/308 |
| 5,090,745 | 2/1992 | Kluger | 285/187 |
| 5,090,747 | 2/1992 | Kotake | 285/319 X |
| 5,104,158 | 4/1992 | Meyer et al. | 285/308 |
| 5,171,028 | 12/1992 | Bartholomew | 277/189 |
| 5,186,500 | 2/1993 | Folkers | 285/55 |
| 5,316,041 | 5/1994 | Ramacier, Jr. et al. | 137/614 |

FOREIGN PATENT DOCUMENTS

| | | | |
|---|---|---|---|
| 163 947 | 9/1949 | Austria . | |
| 2211 173 | 9/1973 | Germany | 285/423 |
| 1 931 | of 1873 | United Kingdom | 285/320 |
| 2250078 | 5/1992 | United Kingdom | 285/305 |

*Primary Examiner*—Dave W. Arola
*Attorney, Agent, or Firm*—Sand & Sebolt

[57] ABSTRACT

A connector assembly includes a connector having an inner member with first and second open ends and a bore extending therebetween. The inner member is formed of a material which is impervious to a particular fluid to flow through the connector assembly. An outer member encapsulates the inner member and is formed of a material dissimilar from the material of the inner member, which material resists abrasions and other deleterious elements to which the connector is exposed. Flexible retaining latches are formed integrally on the outer member of the connector and snap over an annular projection formed on a tubular conduit upon insertion of the conduit through the first open end and into the bore of the inner member. An elastomeric seal disposed in the bore of the inner member provides a fluid tight seal between the conduit and inner member. Another elastomeric seal is located within the bore of the inner member adjacent the second open end, and provides a fluid tight seal with a tubular member inserted therein. The tubular member may be a multi-wall conduit of dissimilar materials to provide both physical protection and prevent effusion. The connector is formed by a method of premolding the inner member of a first plastic material and then inserting the elastomeric seals and metal washer therein. Next, the inner member is placed in a mold cavity and the outer member is molded about and encapsulates the inner member and secures the seals and metal washer within the inner member. A rigid one-piece plastic retaining clip may be slidably mounted within aligned apertures in one end of the connector to removably secure an end of the tubular conduct therein with the metal washer securing the tubular member within the other end of the connector.

18 Claims, 10 Drawing Sheets

CONNECTOR ASSEMBLY AND METHOD OF MANUFACTURE

CROSS REFERENCE TO RELATED APPLICATION

This application is a Continuation-In-Part of application, Ser. No. 08/361,094 filed Dec. 21 1994, now abandoned.

BACKGROUND OF THE INVENTION

1. Technical Field

The invention relates to quick-connect fittings for use in fluid and vapor transmission systems and to a retainer clip for use therewith. More particularly, the invention relates to a connector and connector assembly and its method of manufacture for use in vehicle fluid transmission systems. Even more particularly, the invention relates to such a connector formed of dissimilar materials which will limit the permeability and effusion process of certain fluids being transmitted through the connector without sacrificing its abrasion resistance and holding efficiency and to a retainer clip for releasably securing a tubular conduit to the connector.

2. Background Information

In the automotive industry, as well as other industries, low-cost, reliable and easily operated connectors are needed to provide a connection between fluid-carrying conduits, such as fuel or refrigerant lines, with the other components of the vehicle, which can be connected easily during assembly of the vehicle and subsequently disconnected for repair at a later date.

Fluid transmission systems have progressed from metal tubular lines and machined fittings to plastic tubular lines and molded fittings, and combinations, thereof. The use of plastics has grown to the extent that it is now accepted as a standard of performance in numerous applications. This is especially true in automotive passenger car and truck vapor and fluid transmission systems.

In recent years, it has become necessary to develop fuel transmission systems which are chemically resistant to an increasing variety of volatile fuel mixes, such as alcohol and methyl-alcohol combinations. Additionally, there is an ongoing effort to reduce significantly the system effusion of gases to the atmosphere, an effort made even more difficult because of the new fuel mixes currently being used more often today.

The process of transfer of gas through an aperture whose diameter is small as compared with the distance between molecules of the gas is known as "effusion". Many plastic materials provide apertures or paths through the material for certain gases and block others. The demands currently being placed on fluid transfer systems and the resultant impact to the environment are now of such significance that special approaches are necessary to limit this effusion process or permeability.

Therefore, the need exists for a new family of tubular fittings which not only embody all of the features of the current state of the art fittings, such as quick-connection capability, swiveling, heat resistance, easy disconnect capability, etc., but also the ability to permit increased flow through existing tubular lines, and the ability to significantly reduce the overall vapor effusion rate of the system.

Some examples of prior art connector assemblies and the quick connector are shown in U.S. Pat. Nos. 5,002,315, 3,997,195, 4,669,757, 4,310,185, 4,943,091, 5,261,706, 4,423,892, 4,524,995, 4,601,497, 4,681,351, 4,802,697, 4,915,136, 4,948,175, 4,979,765, 4,981,586, 5,033,513, 5,063,968, 5,067,754, 5,110,161, 5,195,787, 5,232,252 and 4,541,658.

Most of the quick connectors of the above-listed patents are multiple component-members which are molded of plastic or other types of organic polymeric materials. These components are assembled on the end of a tubular conduit having some type of annular radially extending projection or latching member which engages another component of the quick connector in order to secure the connector to the tubular conduit. The other end of the connector is generally provided with a tubular portion formed with a plurality of external annular grooves or barbs which are force fitted into the end of a plastic or rubber tube of the fluid transmission system. This force is sufficient to expand the tube over the barbs or grooves, securing the tube in place. The other end of the connector then receives the end of the tubular member or conduit, which is then secured by engagement of another connector component with the annular latching projection formed integrally with the end of the tubular conduit.

Although these prior art connectors perform satisfactorily for many applications, they do possess certain inefficiencies and disadvantages. The insertion of the tubular end of the connector having the retaining barbs or grooves into the open end of the plastic or rubber tube results in an inside cross-sectional area significantly less than the cross-sectional area of the inside diameter of the tube inserted over the tubular end of the connector. The gases and fluids flowing through the system are sealed by the connector material only by the effectiveness of the material to resist effusion or permeability. These gases and fluids are sealed by the connection of the male tubular extension of the connector into the inside of the tube by the various grooves or protrusions and the interference fit with the inside surface of the tube wall. The connector can also swivel rather easily on the tube. Furthermore, the plastic material can "creep" as a result of repeated hot-cold cycling to which the fluid line and connector are subjected, allowing leakage of the fluid therebetween.

Furthermore, these prior art quick connectors are generally molded of a singular plastic or organic polymer material which may for certain fluids, satisfactorily resist effusion or permeability, but are not as effective as desired for other types of fluids which will flow therethrough. Furthermore, the multiple components of some of these connectors increase the difficulty of connecting and disconnecting the connector onto and from a tubular conduit than is desirable for certain manufacturing operations and repair procedures.

Another known existing type of quick connector is shown in FIGS. 14 and 15 of the application drawings. This connector consists of a single molded member which enables the male end of a tubular conduit having an annular latching member to be snap-fitted therein upon insertion of the conduit into an open end of the connector. However, the other end of the connector includes a tubular male portion having annular projections or barbs, which is forcible inserted into the open end of another tubular member to provide the connection between the two tubular components. This connection reduces the effective inside diameter as described above, and also provides a connection which has been found susceptible to leakage. Also, this single-component connector does not have the required effectiveness to resist effusion or permeability for certain types of fluids from being transferred through the connector.

It is also important that these connectors can be connected easily during assembly of the vehicle and subsequently disconnected for repair at a later date. These connectors require a quick connect mechanism or clip to retain the tubular conduit within the connector. These retainer clips must be small in size and easy to operate because of the limited amount of space in the location where the connectors are used. For example, in automobiles, and especially in front wheel drive automobiles, the amount of available space under the hood to install and perform maintenance or repairs on these connectors is very limited. A mechanic often has a difficult time reaching into the area under the hood or instrument panel when attaching the connector and to grasp and disassemble the connector and conduit.

Several types of retainer clips are currently available which provide a connection between fluid-carrying conduits. For example, U.S. Pat. No. 5,171,028 discloses a seal retainer with a ring-shaped collar with a lip portion surrounding an opening of the collar and extending axially therefrom. The lip portion is adapted to fit tightly within an axial bore portion of a connector housing. Arm portions extend from the outer circumferential positions of the collar substantially parallel to the center axis in a direction opposite of the lip. The connector and conduit can be separated by depressing the surface areas of the arms.

U.S. Pat. No. 5,009,454 discloses a retainer clip for a swivelable quick connector assembly which includes a collar through which the conduit passes, at least one deflectable bent leg projecting from the collar for securing the conduit in the retainer clip and in the connector, and a mechanism for rotationally orientating the leg with respect to a window formed in the connector.

U.S. Pat. No. 4,681,351 discloses a retainer clip having a collar with an aperture for permitting passage of the conduit through the collar. The collar includes at least two spaced deflectable legs projecting from the body and a clasp secured to the legs for securing the conduit in the retainer element and in the connector. The clasp includes a latch with a catch for securing the clasp on the leg of the body.

Other types of prior art retainer clips are shown in U.S. Pat. Nos. 5,104,158; 4,934,655; 5,052,725; 5,316,041 and 4,244,608.

Although these prior art retainer clips perform satisfactorily for many applications, they do possess certain inefficiencies and disadvantages. The projecting arms or legs occupy a relatively large amount of space in applications where space is at a premium. An additional amount of space is required beyond the actual space of the retainer clip to allow a mechanic to depress the legs and disassemble the connector assembly.

Therefore, the need exists for an improved quick connector and connector assembly which limits the effusion process or permeability of various fluids and chemicals through the connector, yet which is easily connected and disconnected to tubular components at both ends of the connector without subsequent leakage or sacrificing holding efficiency.

Likewise, the need exists for an improved retainer clip for use with these quick connectors which occupies a small amount of space, which is easily assembled in and disassembled from the connector, which allows a conduit to be snap-fitted easily within the connector, and which releases the conduit by merely applying pressure to one end of the retainer clip.

SUMMARY OF THE INVENTION

Objectives of the invention include providing a connector which can be rapidly connected and disconnected from tubular components of a fluid transmission system of the type especially used in automobile passenger cars and trucks, and which successfully limits the effusion or permeability of various fluids and chemicals through the material of the connector to the surrounding atmosphere.

Another objective of the invention is to provide such a connector which increases the flow-through by maintaining the internal cross-sectional area of the tubular members connected to both sides of the connector, and in addition, provides for a satisfactory seal with the tubular components, preventing the leakage of the transferred fluids between the connector and tubular components.

Still another objective of the invention is to provide such a connector which uses a plurality of elastomeric sealing members which are mounted within the connector and engage the inserted tubular components to provide for a positive, effective seal therebetween, and yet which will permit in certain applications movement of the connector with respect to one or both of the connected tubular components.

A further objective of the invention is to provide such a connector which is formed of dissimilar plastic materials, one of which is able to provide the chemical resistance to the fluid being conveyed through the connector and provide additional protection from effusion, with the other material providing the abrasive resistance and required strength for sealing connection with tubular components connected to one or both ends of the connector.

A still further objective of the invention is to provide such a connector which enables the male end of one of the tubular components to be snap-fitted into sealing engagement within the interior of the connector, with the other tubular component being permanently encased within the other end of the connector during the manufacture thereof to prevent any leakage.

Still another objective of the invention is to provide for use of the connector in an improved connector assembly, in which at least one of the tubular components or conduits is permanently bonded to the connector and is formed of a multiple-wall construction, whereby the inner layer provides the desired chemical resistance and protection from effusion, with the outer layer providing the abrasion resistance and strength required of the tubular component when subsequently mounted within a vehicle.

A further objective of the invention is to provide such a connector and associated connector assembly which can be used very readily with hoses and/or tubes of various constructions, for example, tubes having an outer sheath of rubber, fiber or wire, enabling the connector assembly to be used in various fluid transfer systems including those having a relatively high internal pressure, and in which the connector can have various configurations, such as a 90° elbow, a T-connection, a straight through connector, or the like, all of which are easily and sealingly secured to tubular components at the opposite ends of the connector.

Still another objective of the invention is to enable the connector and connector assembly to be manufactured in an extremely simple, effective and relatively inexpensive manner, with the connector being a two piece construction of different materials and in which elastomeric sealing rings and a one-way metal retaining washer or ring are retained within an inner member of the connector upon an outer member being molded over the inner member.

Other objectives of the invention include providing an improved retainer clip for quick connect fittings of the type used in vehicle fluid systems which occupies a relatively small amount of space around the periphery of a receiving end of a connector into which an end of a conduit is slidably inserted.

A further objective of the invention is to provide such a retainer clip which is relatively easy to assemble and disassemble with and from the connector, and which has a chamfered surface on one side to allow a conduit to slide easily into the connector and has a flat latching edge to retain the conduit therein.

Another objective of the invention is to provide such a retainer clip which allows the conduit to be easily released from the connector by applying a slight amount of pressure to one end of the clip, and which has a flexible tab which slides into a slot formed in the connector to insure that the clip is properly installed on the connector whereby the chamfered entrance surface of the clip is facing the correct direction for receiving the end of the tubular conduit.

These objectives and advantages are obtained by the improved connector assembly of the invention, the general nature of which may be stated as including a tubular conduit having an outer end and a radially extending latching member spaced inwardly from the outer end of the conduit; an inner member having first and second open ends and having a bore formed therein and extending between said open ends, with the first open end receiving the outer end of the conduit therein; first seal means disposed in the bore of the inner member for providing a seal between the outer end of the conduit and the inner member; an outer member substantially encapsulating and surrounding the inner member, said outer member having first and second open ends which are coaxial with the first and second open ends, respectively, of the inner member, the second open ends receive an end of a tubular member therein to provide fluid communication between the tubular conduit and the tubular member through the inner and outer members; second seal means disposed in the bore of the inner member adjacent the second open end of the inner member, for providing a seal between the inner member and the tubular member; metal ring means disposed in the bore of the inner member adjacent the second seal means for securing an end of the tubular member within the bore of the inner member; and retainer means for cooperating with the latching member of the conduit for releasably retaining the conduit from within the bore of the inner member.

These and other objectives of the invention are also obtained by the improved connector of the invention which provides a quick connection to a tubular conduit, having an outer end and a radially extending latching member, wherein the connector comprises: an inner member having first and second open ends and a bore formed therein and extending between the open ends, the first open end being adapted to receive the outer end of the tubular conduit therein, and the second open end being adapted to receive an end of a tubular member therein; first seal means disposed in the bore of the inner member for providing a seal with the outer end of the tubular conduit; an outer member substantially encapsulating and surrounding the inner member, the outer member having first and second open ends which coaxially align with the first and second open ends, respectively, of the inner member to provide fluid communication between the tubular conduit and the tubular member through the inner and outer members, whereas the inner and outer members are formed of different plastic materials; second seal means disposed in the bore of the inner member for providing a seal with the tubular member, when the tubular member is inserted therein; and retainer means disposed in the bore of the inner member adjacent the second seal means for permitting insertion of the tubular member therein and for preventing subsequent removal of the tubular member therefrom.

These objectives and advantages are further obtained by the method of the invention, the general nature of which may be stated as a method for forming a connector for use in a connector assembly of the type having a tubular conduit with an outer end and a radially extending latching member spaced inwardly from said outer end for connection to a first open end of the connector and a tubular member for connection to a second open end of the connector, wherein the inner member have first and second open ends and a bore extending between the open ends, and first and second seal means disposed in the bore of the inner member for providing seals with the tubular conduit and the tubular member, respectively, and an outer member surrounding said inner member; the method includes the steps of molding the inner member of a first plastic material; placing the inner member in a mold cavity; and injecting a second plastic material into the mold about the inner member to mold the outer member about the inner member substantially encapsulating and surrounding said inner member.

BRIEF DESCRIPTION OF THE DRAWINGS

Preferred embodiments of the invention, illustrative of the best modes in which applicants have contemplated applying the principles, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENTS

A first embodiment of the connector of the present invention is indicated generally at 1, and is shown particularly in FIGS. 1–8. Connector 1 consists of two main components, inner and outer members, indicated generally at 2 and 3, respectively, and shown in FIGS. 4–6 and 1–3, respectively.

Figure 1:
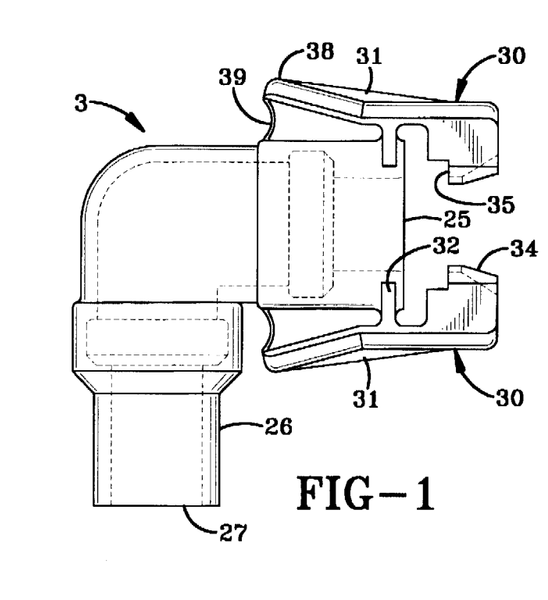
FIG. 1 is a side elevational view of the outer member of the connector of the present invention, with certain internal features being shown in dash lines.
Figure 2:
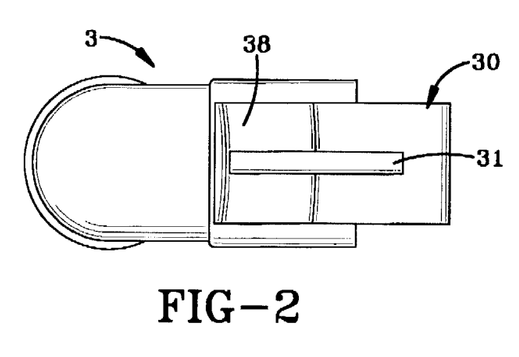
FIG. 2 is a top plan view of the outer member of the connector of FIG. 1.
Figure 3:
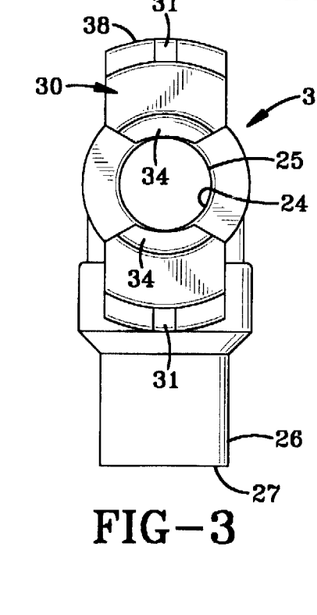
FIG. 3 is a right side end elevational view of FIG. 1.
Figure 4:
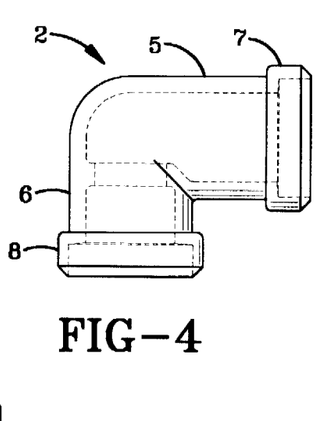
FIG.4 is a side elevational view of the inner member of the connector of the present invention, with internal features shown in dash lines.
Figure 5:
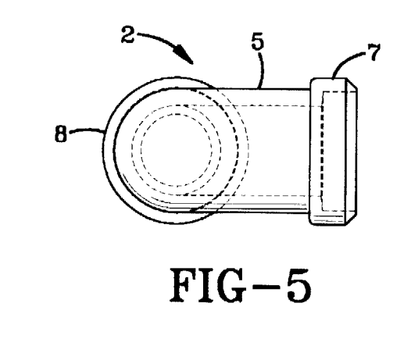
FIG. 5 is a top plan view of FIG. 4.
Figure 6:
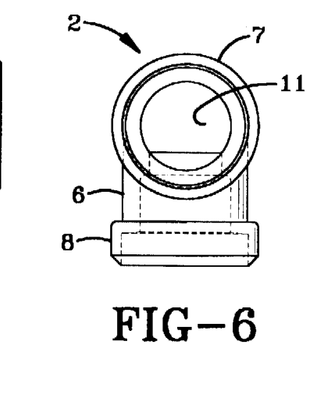
FIG. 6 is a right-hand elevational view of FIG. 4.
Figure 7:
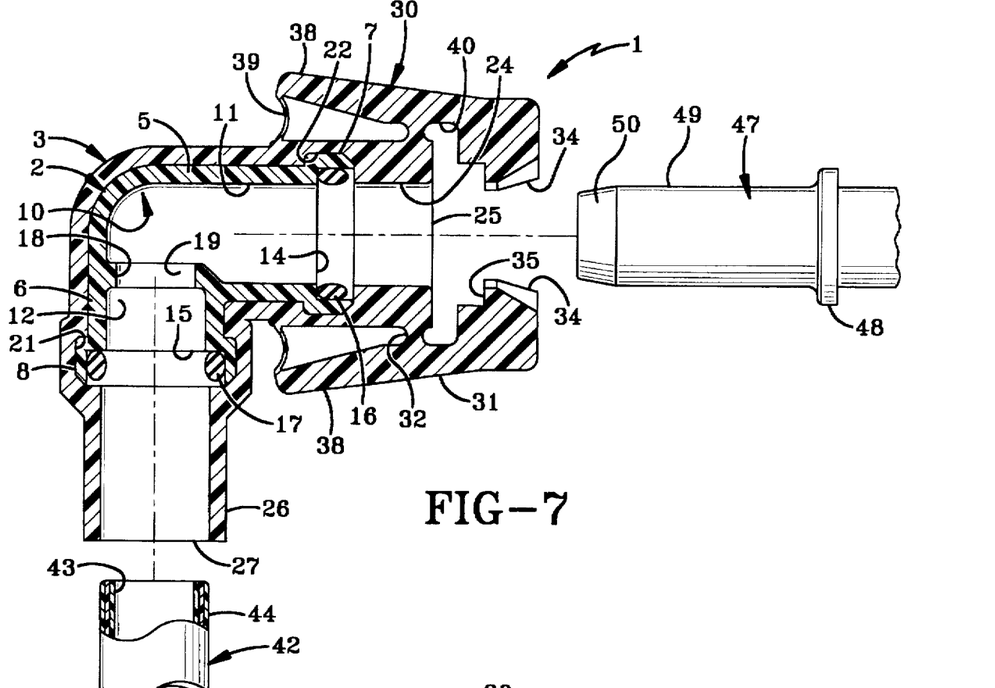
FIG. 7 is an enlarged sectional view of the connector consisting of the inner and outer members of FIGS. 1–6 in assembled position with two tubular components being shown just prior to assembly with the connector.

Inner member 2 in the first embodiment, is a 90° elbow and includes a first tubular portion 5 and a second tubular portion 6 oriented 90° with respect to each other. Tubular portions 5 and 6 terminate in outer annular flanges 7 and 8, respectively. Referring to FIG. 7, inner member 2 is formed with a right-angle bore 10, which is comprised of bore sections 11 and 12 formed in tubular portions 5 and 6. End flanges 7 and 8 are formed with inner annular shoulders 14 and 15, respectively, in which are seated elastomeric O-rings 16 and 17, respectively. In the preferred embodiment, O-rings 16 and 17 are formed of a fluorosilicone. Inner bore portions 11 and 12 are separated by an inner annular flange 18 which defines an opening 19, which provides fluid communication between bore portions 11 and 12.

Outer member 3 (FIGS. 1–3 and 7) has a right-angle configuration similar to that of inner member 2, and completely encapsulates inner member 2. Outer member 3 is formed with an inner annular groove 21 in which is seated outer annular flange 8 of inner member 2, and a second annular groove 22 in which is seated outer annular flange 7 of inner member 2. These grooves assist in securing inner member 2 within outer member 3. Outer member 3 includes a tubular bore portion 24 which extends from an outer open end 25, and is similar in diameter to the inner diameter of bore portion 11 of inner member 2. The other end of outer member 3 includes a cylindrically extending end wall 26, which defines a second open end 27. Cylindrical end wall 26 has an internal diameter generally equal to the internal diameter of bore portion 12 of tubular portion 6 of inner member 2, which preferably is equal to the internal diameter of bore portion 11 of tubular portion 5.

In accordance with one of the features of the invention, a pair of latching members 30 are formed integrally on the end of outer member 3, and, in particular, with that portion of outer member 3 which forms tubular bore portion 24. Each latching member 30 includes a latching leg or finger 31 which is pivotally mounted to outer member 3 by an integrally formed pivot 32. The forward end of each latching member 30 includes a tapered camming surface 34, which terminate in arcuate latching shoulders 35. The inward ends of latching members 30 include thumb and finger-engaging portions 38, which, when depressed, will pivot latching shoulders 35 outwardly about pivots 32. A thin flexible strip of material 39 may extend from outer member 3 to the ends of each of the latching members 30 to provide a biasing force on latching members 30, biasing latching shoulders 35 toward each other and into a latching position. An arcuate groove 40 is formed in each finger 31 adjacent open end 25 of outer member 3 to provide for the reduced thickness of material to form pivots 32.

Figure 8:
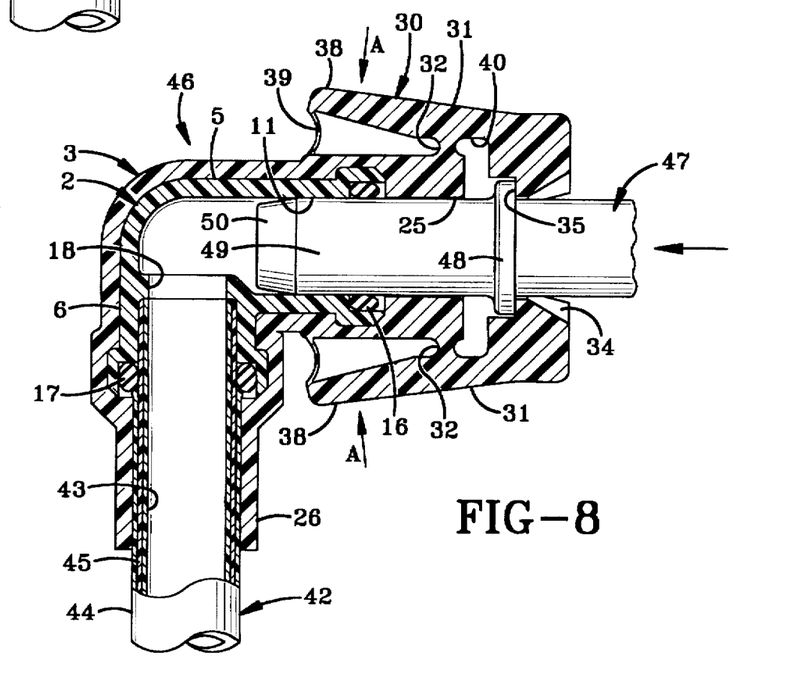
FIG. 8 is a sectional view similar to FIG. 7, with the two tubular components shown in assembled position with the connector.
Figure 9:
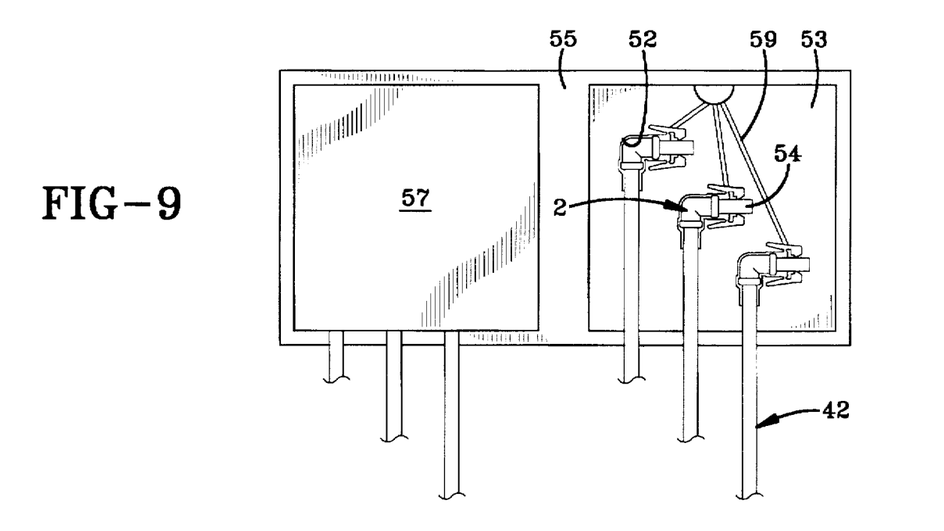
FIG. 9 is a top diagrammatic plan view showing the initial steps of the method of the present invention of molding a plurality of the connector of FIGS. 1–8.
Figure 9A:
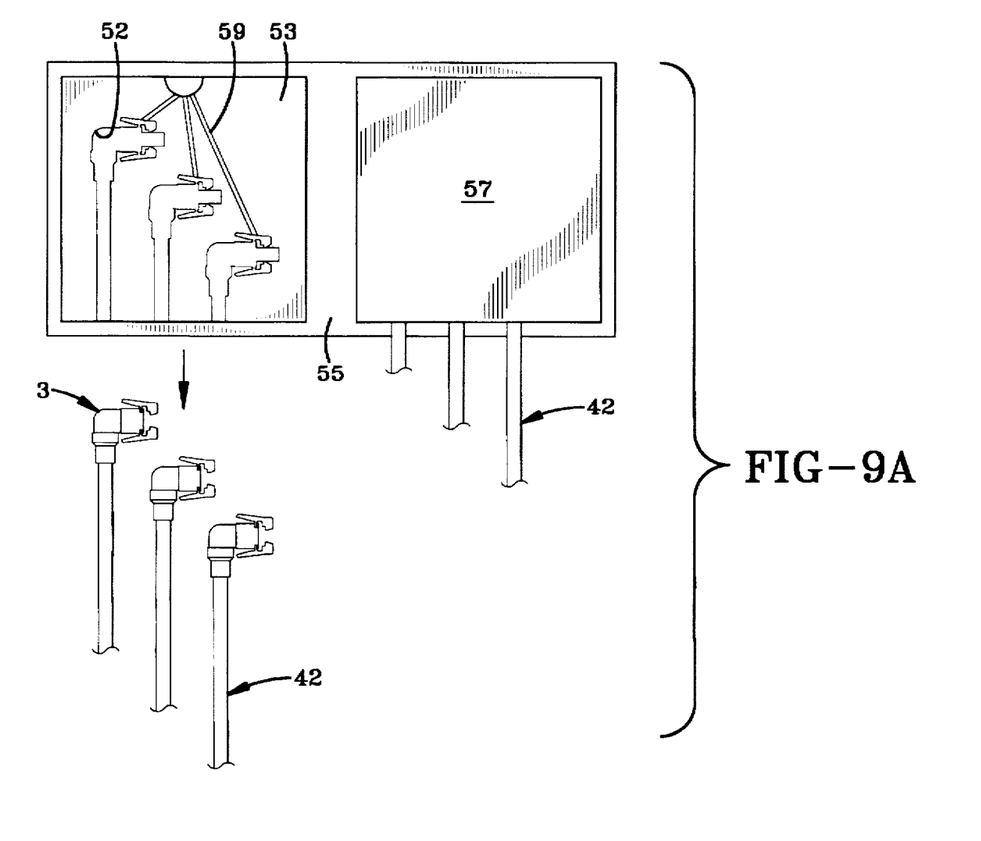
FIG. 9A is a top diagrammatic plan view similar to FIG. 9, showing the completion the molding of three connectors of the present invention and their removal from the mold cavities.
Figure 10:
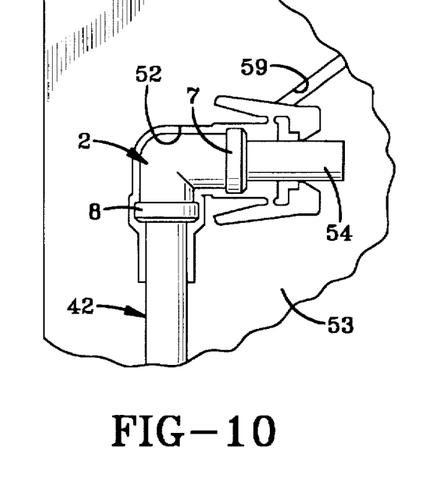
FIG. 10 is an enlarged fragmentary diagrammatic view of one of the mold cavities of FIG. 9.
Figure 10A:
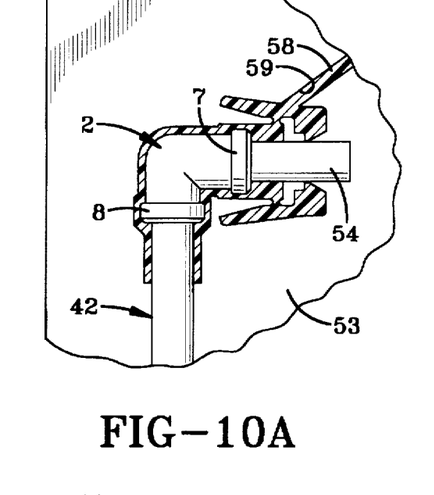
FIG. 10A is a fragmentary diagrammatic view similar to FIG. 10, showing the injection molding of the outer member about the inner member of one of the connectors within the mold cavity.

A tubular member 42 is inserted into open end 27 of cylindrical end wall 26, and secured therein, as described further below, when forming a connector assembly 46, as shown in FIG. 8. In accordance with one of the features of the invention, tubular member 42 will be formed with multiple walls, and in the embodiment shown in the drawings, will have inner and outer walls 43 and 44 and an intermediate wall 45 sandwiched therebetween. As an example, inner and outer walls 43 and 44 will be formed of Nylon 6, with intermediate wall 45 being formed of an acetal, such as polysulfide.

Intermediate wall 45 will provide an efficient barrier to the effusion or permeability of the various chemicals and gases, preventing their escape into the surrounding atmosphere. Inner and outer walls 43 and 44 will provide the strength and abrasion resistance needed for the tubular member. However, it is readily understood that tubular member 42 could consist of only an outer wall formed of a material such as Nylon 6 to provide for the strength and abrasion resistance, with only a single inner wall to prevent the effusion or permeation of the gases through the tubular member. Furthermore, the tubular member 42 could be formed of even a greater number of walls than the three shown in the preferred embodiment and described above, without affecting the concept of the invention.

Tubular member 42 preferably will have a short portion of its outer wall 44 stripped away, whereby the intermediate and inner walls 45 and 43 will extend beyond O-ring 17 until abutting annular inner flange 18 to fully seat the end of tubular member 42 within inner and outer members 2 and 3. However, for certain applications, outer wall 44 could extend completely within bore portion 12 of tubular portion 6 of inner member 2.

Connector assembly 46 will further include a tubular conduit, indicated generally at 47, which for many applications will be formed of metal. Conduit 47 has an annular radially extending latching projection 48, and a male cylindrical end 49 terminating in a tapered outer tip 50. As shown in FIG. 8, male end 49 is inserted through open end 25 of outer member 3 and beyond O-ring 16 and into bore portion 11 of inner member 2. Annular latching projection 48 slides along tapered camming surfaces 34, spreading latching members 30 outwardly until latching member 48 moves beyond cam surfaces 34 and snaps into position with latching shoulders 35, in which position latching members 30 return to their latching position, securing tubular member 47 in connector 1. Strips 39 will assist in biasing latching members 30 to their latch-engaged positions with latching projection 48, as shown in FIG. 8, to retain tubular member 47 in its latched position within inner and outer members 2 and 3. As shown in FIG. 8, a portion of male end 49 will sealingly engage O-ring 16 and, preferably, will be in a sliding engagement with the inner cylindrical surface which defines bore portion 11 of inner member 2.

As can be seen in FIG. 8, the internal cross-sectional area of tubular member 42 and of tubular conduit 47 are maintained, and are not restricted in any manner due to their connection with connector 1, as in prior connectors for similar applications.

It is easily seen that upon pressing inwardly in the direction of arrows A on latching members 30, latching shoulders 35 will disengage annular latching projection 48 of tubular conduit 47, enabling the conduit to be removed easily from within connector 1 for repair or replacement.

In accordance with another feature of the invention, connector 1 and connector assembly 46 are manufactured by an improved method, as shown particularly in FIGS. 9, 9A, 10 and 10A. Inner housing 2 is preformed of the desired plastic material, and O-rings 16 and 17 are inserted within their respective retaining grooves 21 and 22. Next, the end of tubular member 42 is prepared, for example, in the preferred embodiment, by removing a short section of outer wall 44, after which the exposed portion of intermediate wall 45 and inner wall 43 is inserted completely within cylindrical end wall 26 of outer member 3 until it abuts against inner flange 18. This subassembly is then placed within a cavity 52 formed in a mold base 53 (FIGS. 9 and 10), with tubular member 42 extending beyond mold cavity 52. Next, a mandrel 54 is inserted through tubular bore portion 24 of outer member 3 and into bore portion 11 of inner member 2 to prevent the flow of molten plastic material into bore portion 11.

A conventional horizontal-fill vertical clamp injection molding machine preferably is utilized in forming connector assembly 46. The machine includes a horizontal sliding table 55, with two or more mold bases 53, and is referred to in the industry as "shuttle molding". The process requires two mold bases 53 and one mold top 57. Multiple mold cavities 52 may be used, three of which are shown in the drawings. The number of cavities will depend upon machine molding capacity versus load-unload mold time. Plastic material 58 which forms outer member 3 flows through an inlet opening 59 formed in mold base 53 (FIG. 10A) until it fills the cavity surrounding the subassembly and after cooling forms outer member 3, which completely encases inner member 2 and secures tubular member 42 within inner member 2. The machine cycles and the mold opens by removal of mold top 57, and the loaded mold base moves horizontally to the left-hand position of FIG. 9A where the three molded subassemblies are removed from mold cavities 52 and the loading cycle is then repeated, as shown in the right-hand portion of FIG. 9.

Figure 11:
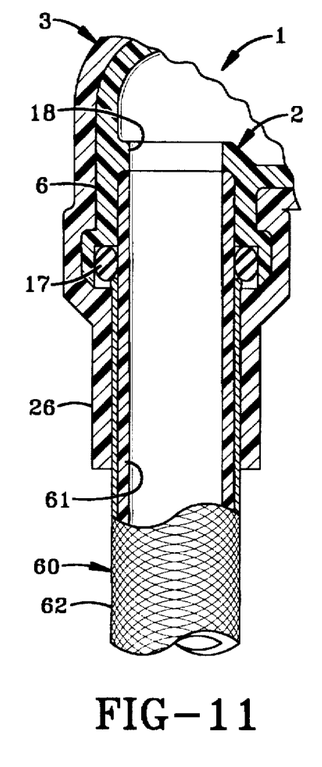
FIGS. 11, 11A and 11B are fragmentary sectional views showing other types of tubular members connected by various arrangements to the connector of FIGS. 1–10.

Connector 1 can also be used very readily with other types of hoses and/or tubes of a construction other than that described above for tubular member 42. As shown in FIG. 11, a modified tubular member 60 is shown molded within cylindrical end wall 26 out of outer member 3. Member 60 has an inner wall 61 formed of a single layer of plastic which projects into inner member 2 and abuts against annular flange 18. An outer braided layer 62 of steel wire is stripped away a short distance from the end of tubular member 60, and preferably terminates adjacent O-ring 17. This provides a connector adaptable for use in fluid transmission systems containing relatively high internal pressures gas or fluid pressures.

Figure 11A:
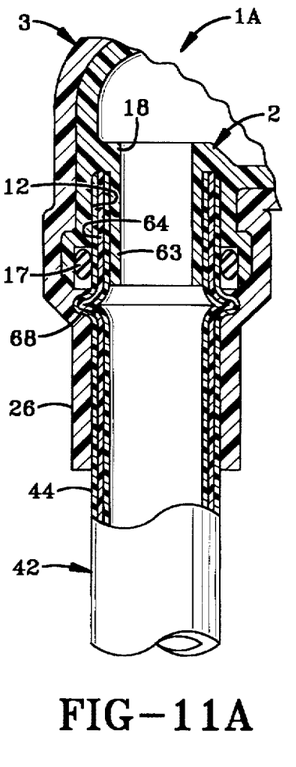

FIG. 11A shows a modified connector 1A, which is similar to connector 1 described previously, with the exception that an inner sleeve or tube 63 is molded integrally with annular flange 18 of inner member 2. Sleeve 63 extends axially within bore portion 12, and forms an annular recess 64 thereabout, into which the end of tubular member 42 is inserted. Another modification of connector 1A is the formation of an annular protrusion 68 on tubular member 42 generally adjacent the open end thereof. Protrusion 68 assists in retaining tubular member 42 within cylindrical end wall 26 of connector 1A when molded therein in a similar manner as discussed above and shown in FIGS. 9–10A. Inner sleeve 63 assists in reducing "creep" of member 42 and fluid leakage around O-ring 17 by more securely trapping the end of member 42 between inner sleeve 63 and inner member 2. This enhances the sealing relationship between tubular member 42 and O-ring 17. In forming inner sleeve 63, a mandrel would be inserted within the open end of inner member 2 when molding the same.

Figure 11B:
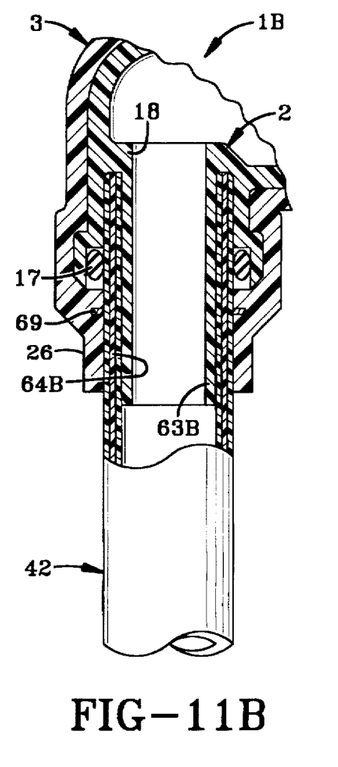

Another modification to the connector of the present invention is indicated at 1B, and is shown in FIG. 11B. This embodiment is similar to connectors 1 and 1A, with the main difference being that an inner sleeve 63B is provided, similar to sleeve 63 except that it extends completely through and slightly beyond bore portion 12 of inner member 2. Sleeve 63B provides an annular recess 64B surrounding sleeve 63B for receiving the end of tubular member 42. Sleeve 63B also provides reinforcement for tubular member 42 to resist injection molding pressure.

Another modification in connector assembly 1B of FIG. 11B is the use of a one-way metal lock washer 69 which is slid along the outer end of tubular member 42 prior to placing member 42 and inner member 2 in mold cavity 52. When outer member 3 is molded about inner member 2 and a portion of tubular member 42, washer 69 forms a more secure bond with outer member 3 to prevent member 42 from pulling out of the open end of connector 1B. A steel mandrel would be inserted within the open end of inner member 2 when molding inner member 2.

FIGS. 11, 11A and 11B show that various arrangements can be provided at the open end of the connector opposite the quick connect end, when forming the connector assembly. This provides for either molding a tubular member 42 thereon or, in the alternative, provides an open end or annular recess therein into which the end of tubular member 42 can be slidably inserted after the connector has been molded and subsequently secured by an adhesive, sonic welding or other arrangement for forming a fluid-tight, anti-creep connection therebetween. It is readily understood that connectors 1, 1A and 1B could be formed with other end configurations so that a tube or pipe could be secured by conventional threads, compression fittings, etc. without affecting the concept of the invention.

The insert molding process of the present invention also makes it feasible to significantly increase the strength of complex fittings through the redundancy of layers and materials offered. For example, glass-filled Nylon is not a good candidate for fittings, because the glass fill provides pass-through material, increasing the potential for effusion. However, it can be used in the present method and connector assembly as one of the outer layers, providing exceptionally high overall strength, since an inner or intermediate layer of a dissimilar material will provide a barrier to prevent effusion.

Figure 12:
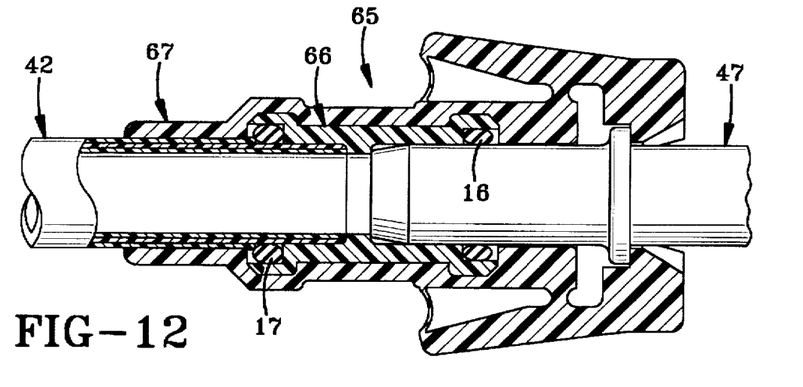
FIG. 12 is a sectional view similar to FIG. 8, showing a straight-through connector configuration of the present invention with two tubular members connected thereto.
Figure 12A:
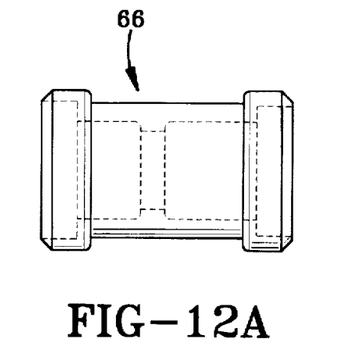
FIG. 12A is an elevational view of the inner member of the connector of FIG. 12.

Another embodiment of the present invention is indicated generally at 65, and shown in FIG. 12. Connector 65 is similar in most respects to connector 1, with the main difference being that inner member 66 (FIG. 12A) is formed as a straight cylindrical member instead of a 90° elbow, as is inner member 2 of connector 1. Likewise, when an outer member 67 is molded about inner member 66, it will also assume a straight cylindrical configuration, trapping inner member 66 therein, and providing a straight through-path for the fluid or gases flowing through tubular member 42 and tubular conduit 47. The other features and components of inner and outer members 66 and 67 are the same as those described above with respect to connector 1.

Figure 13:
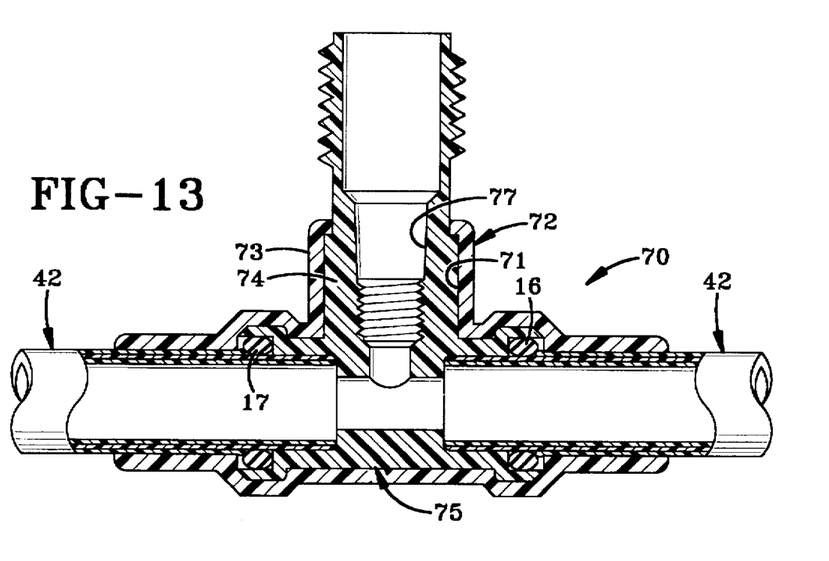
FIG. 13 is a sectional view similar to FIGS. 8 and 12, showing another embodiment of the connector of the present invention.

A further embodiment of the improved connector and connector assembly is shown in FIG. 13, with the modified connector being indicated at 70. Connector 70 is generally similar to that of connector 65, described above and shown in FIG. 12, in that it provides for a straight flow-through path of the liquid or gas, and is shown connected to two tubular members 42, although it could be connected to one or two tubular conduits 47, if desired. Connector 70 includes a third inlet port 71 formed in the outer member 72 by a cylindrical wall 73, in which is contained a cylindrical wall 74 of an inner member 75. Inner member 75 is similar to inner member 66 described above, except for the inclusion of cylindrical wall portion 74 extending normal to the main cylindrical body of the inner member. Cylindrical wall 74 is formed with an opening 77 in which a valve (not shown) can be mounted, which valve enables measurements to be made of the pressure level of the fluids flowing through the connector and conduits 42.

It is readily seen that other types of connector constructions can be utilized. For example, the connector shown in FIG. 13 could be a T-connector, with the check valve being replaced with another tubular member 42 or tubular conduit 47. Again, as shown in FIGS. 12 and 13, the improved connector of the present invention provides a connector in which the inner member is formed of a dissimilar material than the outer member, which substantially encases the inner member. This enables the inner member to be formed of a material which is able to withstand corrosion and harmful effects of the various fluids flowing through the connector, and, more importantly, eliminates effusion of the various vapors from permeating through the connector and into the surrounding atmosphere. Likewise, this enables the outer member to be formed of a more rigid, abrasive-resistant material able to withstand the harsh environments to which the connector may be exposed, as well as providing the required structural strength for connection to the various tubular members adapted to be connected therewith. Likewise, the improved connector does not reduce the inside diameter of the connected tubular members, and by the use of the elastomeric O-rings, prevents the escape of fluids from between the connector and tubular members.

If desired, multiple O-rings can be utilized to further increase the sealing connection between the connector and tubular members without affecting the concept of the invention or the improved results achieved thereby. As shown in FIGS. 8, 11 and 12, O-ring 17 bears directly on the intermediate wall of tubular conduit 42 or the inner layer of tubular conduit 60 to prevent leakage around the end of the tube and between the layers under the O-ring seal. The amount of this leakage may be so minute that it is insignificant and it may not be necessary to strip the outer tube layer for many applications. The improved connector also can allow tubular conduit 47 to swivel or rotate with respect to the connector while still retaining its seal with elastomeric O-ring 16. Staking or marking the tube at a point on its circumference in the mold area can prevent swiveling from occurring, if desired. Furthermore, the "creep" problem described previously present in many existing connectors is effectively resolved by the use of the elastomeric high-strength seals 16 and 17 incorporated into the improved connector.

Figure 14:
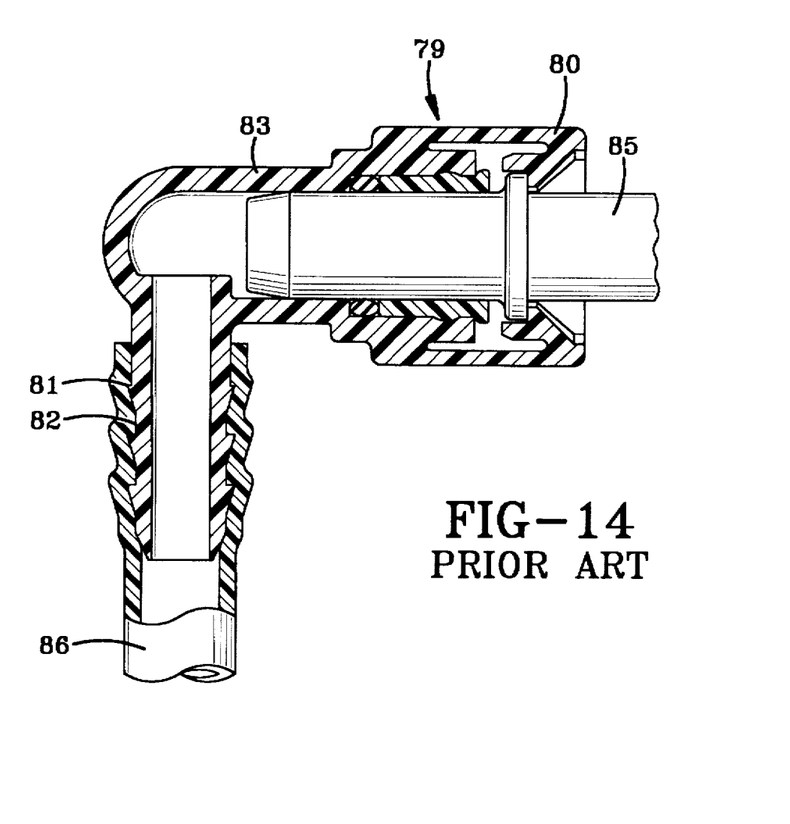
FIGS. 14 and 15 are sectional views of two prior art connectors.
Figure 15:
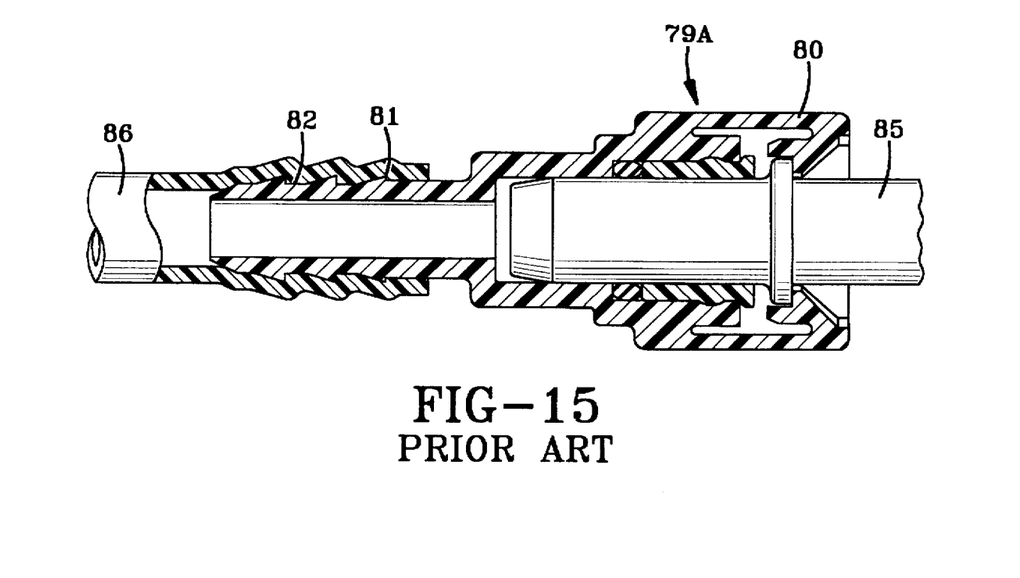

FIGS. 14 and 15 show two prior art connectors 79 and 79A of which the present is an improvement thereon. Both of these connectors are provided with latching members formed integrally with the main body 83 of the connector. However, the main bodies of these connectors are formed of a single layer of plastic material, preferably glass-filled Nylon, in order to provide the required strength for coupling with a tubular conduit 85 and for insertion into the open end of a tubular member 86 which is retained thereon by the plurality of barbs 81 formed on the cylindrical wall portion 82 thereof. However, nothing is provided in either of these prior art connectors which will reduce the effusion of vapors from the fluid flowing therethrough to the surrounding atmosphere, nor provide for a satisfactory connection at the opposite end of the connector from that of latches 80, which does not reduce the cross-sectional area of the tubular member nor provide a satisfactory seal therewith, as does the connector of the present invention, described previously.

Figures 16, 18:
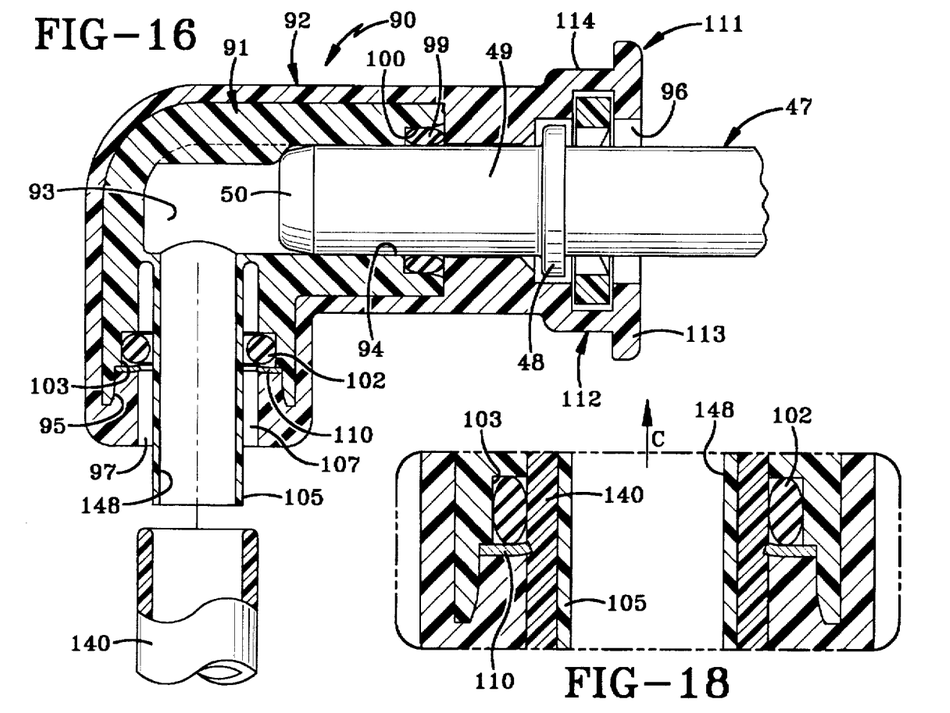
FIG. 16 is a sectional view of a modified connector consisting of inner and outer members in assembled position with one tubular component being retained therein, and with a second tubular component being shown just prior to assembly with the connector.
FIG. 18 is a greatly enlarged fragmentary sectional view of the encircled portion of FIG. 17.
Figure 17:
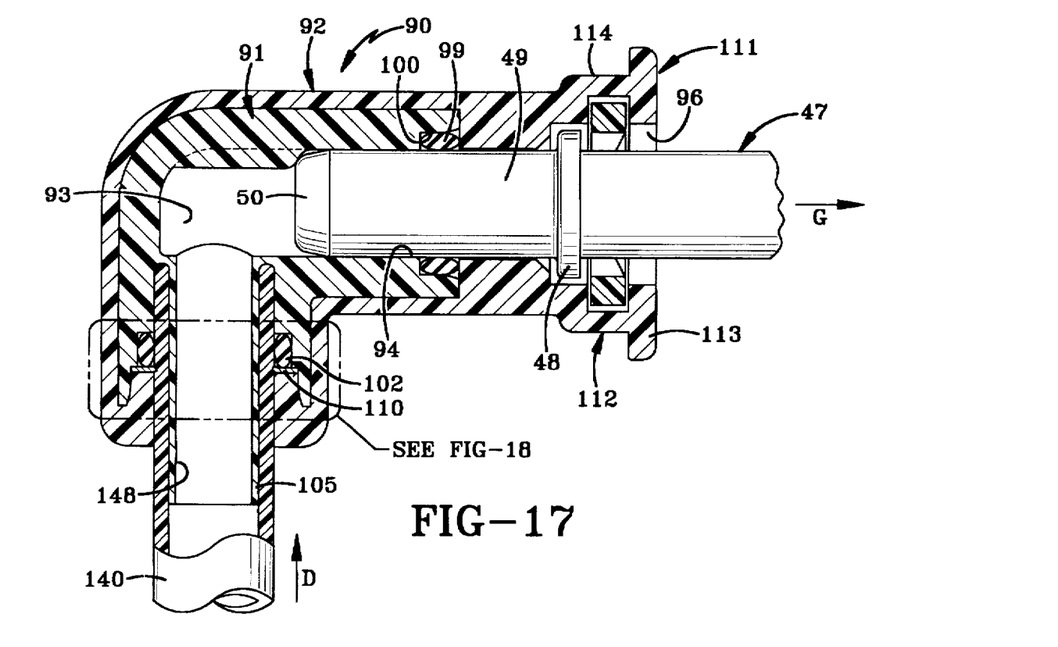
FIG. 17 is a sectional view similar to FIG. 16 showing the two tubular components in assembled position with the connector.

Another embodiment of the connector of the present invention, is indicated generally at 90 and is shown in FIGS. 16–20. Embodiment 90 includes inner and outer members indicated generally at 91 and 92, respectively, both of which are 90° elbows with inner member 91 being surrounded by and encapsulated within outer member 92, as discussed further below. Inner member 91 includes a right angled bore 93, having an open first end 94 and an open second end 95, which open ends coaxially aligned with open ends 96 and 97, respectively, of outer member 92. A first sealing O-ring 99 is mounted within an annular stepped shoulder 100 adjacent open end 94 of inner member 91, and a second elastomeric O-ring 102 is mounted within an annular step shoulder 103 formed in inner member 91, adjacent open end 95. A cylindrical sleeve 105, preferably is formed integral with inner member 91 and extends axially within the bore thereof and extends beyond open end 97 of outer member 92, as shown in FIGS. 16 and 17. Sleeve 105 forms an annular recess 107 between the sleeve and the inner adjacent cylindrical surface of outer member 92.

In accordance with another feature of the invention a one-way metal washer or retaining ring 110 is seated against annular shoulder 103 adjacent O-ring 102. Washer 110 is an usual annular metal ring having, a slightly curved inner edge as shown if FIG. 18, which permits the passage of a rod or tube therethrough in a first direction, as indicated by arrow C in FIG. 18, yet retards or prevents movement of the rod or tube in the opposite direction through the washer.

Figure 20:
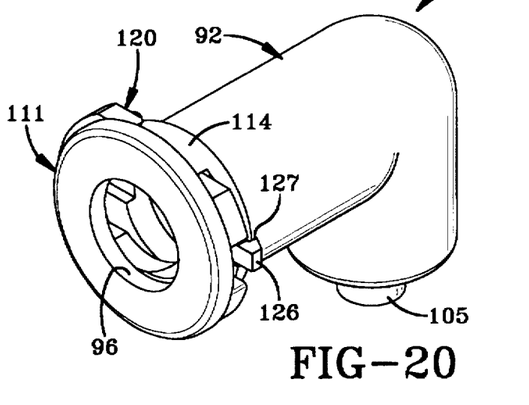
FIG. 20 is a perspective view similar to FIG. 19 showing the retainer clip in position within the end of the connector.
Figure 21:
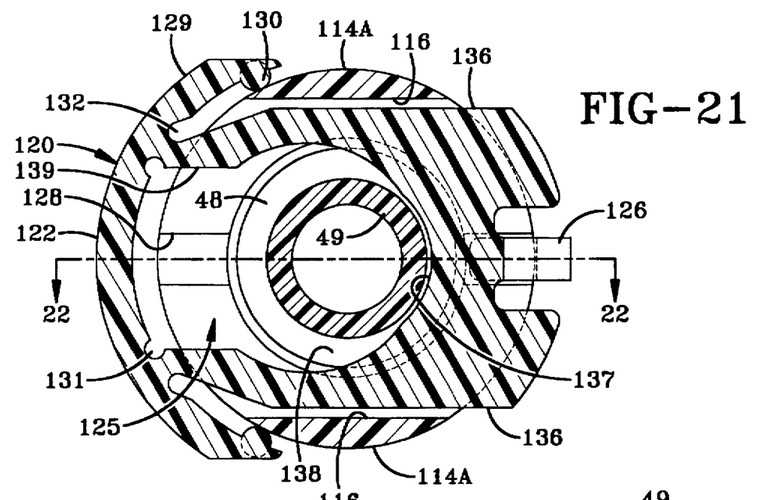
FIG. 21 is a sectional view of the connector and clip of FIG. 20 retaining a tubular component therein.
Figure 22:
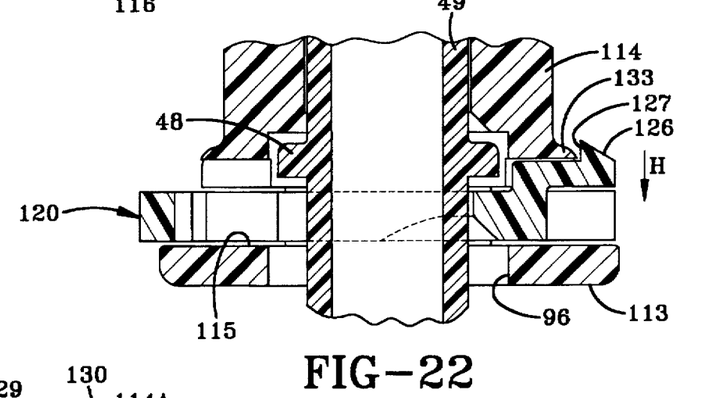
FIG. 22 is a sectional view taken on line 22—22, FIG. 21.
Figure 23:
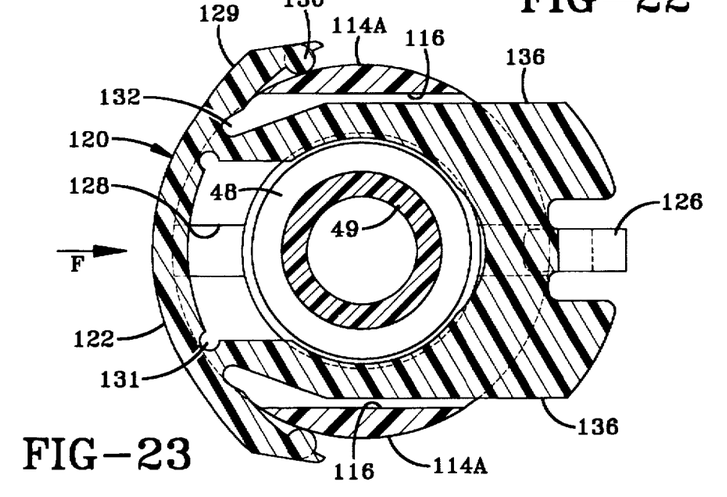
FIG. 23 is sectional view similar to FIG. 21 showing the clip moved to the tubular component release position.

In further accordance with the invention, connector 90 is formed with a unique latching end indicated generally at 111, formed adjacent open end 96 of outer member 92. Latching end 111 includes a cylindrical shaped front housing 112 formed with a stepped bore. Housing 112 may have various outer surface shapes, including an enlarged diameter front cylindrical portion 113 and a reduced diameter cylindrical rearward portion 114. A pair of similar opposed apertures 115 are formed in reduced diameter portion 114 and have an arcuate shape for receiving an improved retaining clip 120 therein. Each aperture 115 has an arcuate length of approximately 115° and are separated from each other by diametrically opposed arcuate sections 114A of cylindrical portion 114, which have parallel spaced inner surfaces 116 as shown in FIGS. 21 and 23. Sections 114A each have an arcuate length of approximately 65°. Sections 114A secure clip 120 within housing 112, when clip 120 is an inserted position therein, as shown in FIGS. 20 and 21 and described further below.

Clip 120 (FIGS. 19 and 19A) is a rigid one-piece member, preferably molded of a high strength plastic material. Clip 1 includes a pair of diametrically opposed arcuate end members 121 and 122, which are connected by spaced generally parallel sides 123. End members 121 and 122 and sides 123 form an elongated inner opening 125. A flexible guide tab 126 is form integrally with end 121 and extends outwardly in a stepped relationship therefrom and includes a latching shoulder 127. End members 121 and 122 and sides 123 form a relatively rigid member in contrast to prior art clips having flexible legs which expand and contract to capture a conducted therebetween.

Figure 19:
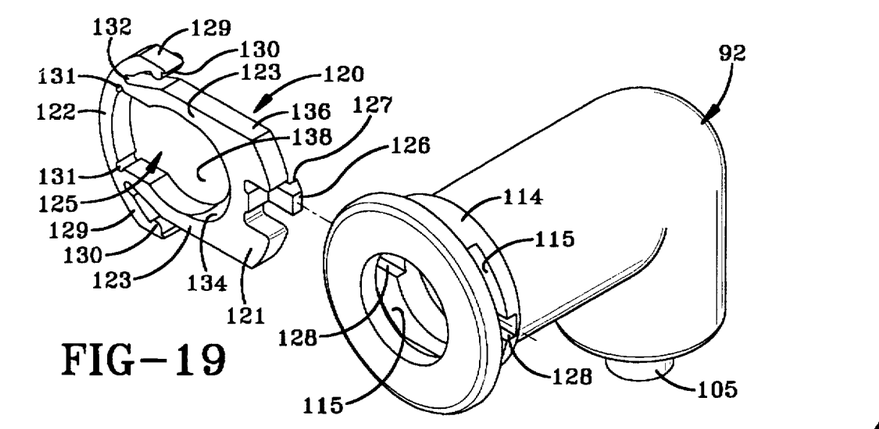
FIG. 19 is a perspective view showing the connector of FIG. 16 with the retaining clip being inserted therein.
Figure 19A:
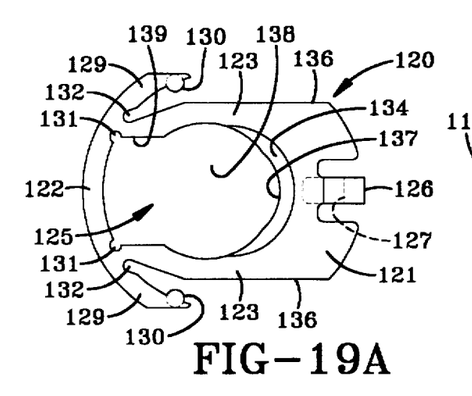
FIG. 19A is a plan view of the retaining clip of FIG. 19.

A pair of curved flexible fingers 129 extend outwardly from end 122 and include a partially circular nub 130 on an inner surface therefore adjacent the extended ends. Two pairs of partially circular shaped recess 131 and 132 are formed at the junction of each finger 129 and end member 122 to provide increased flexibility between the fingers and the end member. A chamfered surface 134 is formed in a front inner edge of end member 121 to allow a conduit to slidably pass therethrough, as discussed further below. As shown in FIGS. 19A and 21,sides 123 of clip 120 have generally flat outer edges 136, which extends parallel to each other. Furthermore, elongated inner opening 125 (FIG. 19A) includes a reduced diameter arcuate portion 137 adjacent arcuate end 121, which communicates with a larger diameter generally circular center portion 138, which merges into a slotted portion 139, which terminates at end member 122.

Referring to FIG. 16–18, a tubular member 140 is shown seated within annular recess 107 formed between sleeve 105 and inner and outer members 91 and 92 and is secured therein by retainer ring or washer 110. Tubular member 140 is shown as a mono-wall tube, although it is readily understood that it could be a multiple-wall member as shown in and discussed previously above. Tubular member 140 can be slidably inserted easily into recess 107 by applying a manual force thereto in the direction of arrow D, where it forms a fluid tight seal with O-ring 102 and is locked in position by retainer ring 110. Thus no additional attachment means of any type is required to secure member 140 to connector 90, and sleeve 105 provides reinforcement to the connected end of member 140 and prevents possible loosening of the fluid tight seal therein, which can occur due to "creep", in the plastic material over an extended period of time.

Tubular conduit 47 is installed easily within open end 94 of inner member 91 and open end 96 of outer member 92 by first inserting clip 120 into apertures 115 of front housing 112 of latching end 111, as shown in FIGS. 19–23. The thickness of end members 121 and 122 and of sides 123 is just slightly less than the wide of apertures 115, and the distance between the outer flat edges of side 123 is slightly less than the diametric distance between the parallel inner surfaces 116 of apertures 115 as best shown in FIGS. 21 and 23, to permit clip 120 to be slidably inserted through the apertures into the position shown in FIG. 20. When inserting clip 120 through apertures 115, flexible tab 126 will move through a pair of diametrically opposed and aligned guide channels 128 (FIG. 19) formed in cylindrical portion 114 of housing 112. Guide tab 126 ensures that clip 120 can only be installed so that chamfered surface 134 faces outwardly for receiving tapered outer end 50 of tubular conduit 47 when inserted into the connector. However, it is readily seen and understood that clip 120 can be inserted from either direction into connector 90 due to the formation of the pair of opposed channels 128. However, regardless of which direction clip 120 is inserted through apertures 115, tab 126 ensures that the chamfered surface is always facing outwardly for receiving the tapered end of tubular conduit 47.

To lock tubular conduit 47 within connector 90, clip 120 is forced in the direction of force arrow F (FIG. 23) so that enlarged generally circular center portion 138 of elongated opening 125 is coaxial with open end 96 of outer member 92. Thus enables annular latching flange 48, which has a diameter approximately equal to that of central portion 138, to pass therethrough with a generally tight sliding fit, until end portion 49 is seated within the bores of inner and outer members 91 and 92 in a fluid sealing engagement with O-ring 99 as shown in FIGS. 16 and 17. Upon the release of force F on end member 122 of clip 120, the flexibility of fingers 129 will bias the clip to the lock position of FIG. 21 wherein the smaller reduced diameter portion 137 of inner opening FIG.25 moves into engagement with conduit portion 49 and behind annular latching projection or flange 48 to lock conduit 47 therein. To remove conduit 47 from within connector 120, the reverse operation is performed. Namely force F is reapply to end member 121 as shown in FIG. 23, depressing fingers 129 with nubs 130 moving along cured surfaces 114A providing a camming action therebetween, enabling the conduit to be pulled in the direction of arrow G (FIG. 17), whereby annular flange 48 moves through the complemental shaped and equal diameter of central portion 138 of clip opening 125.

Flexible tab 126 snaps behind an edge 133 of cylindrical portion 114 (FIG. 22) when clip 120 is in the locked portion with tubular conduit 47, to securely retain the clip in the locked position. Tab 126 is merely pushed inwardly in the direction of arrow H, FIG. 22, to release its engagement with edge 133 permitting clip 120 be moved to the unlocked position where enlarged central portion 138 aligns with the connector bore.

In accordance with another of the features of the invention, inner member 91 may contain imbedded carbon or other types of material, which renders the inner member and sleeve 105 as an electrical conductive material. This will provide a continuous electrical flow path from tubular conduit 47 to tubular member 140 to prevent the build-up of static electricity, which could become a problem, when the connector is used in fuel line applications. Likewise, as discussed previously, the low permeation of the conductor and in particular the formation of inner member 91 of various low porosity materials, reduces the escape of gases into the atmosphere, while permitting outer member 92 to be formed of a scuff and abrasive resistance material. Likewise, the elastomeric O-rings provide a fluid tight seal with the tubular conduit and tubular member, also preventing the escape of vapors and gases into the atmosphere. Also, retaining ring 110 holds tubular member 140 firmly in the connector by the simple insertion of the tubular member into recess 107, eliminating the need of additional attaching components.

Figure 24:
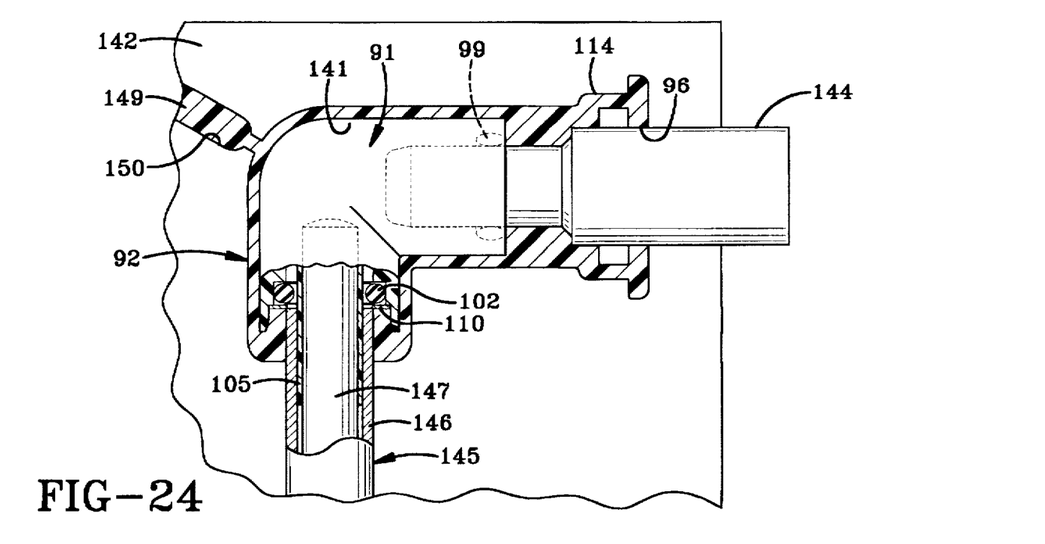
FIG. 24 is a diagrammatic view, with portions in section, showing the manner of molding the outer member over the inner member to form the connector of FIG. 19.

The improved method of molding connector 90 is shown in FIG. 24 and is similar in many respects to the method described above and shown in FIGS. 9–9A. Inner member 91, which can be molded at a remote site, is placed within a cavity 141 of a mold 142, and a mandrel 144 is inserted into the bore of inner member 91. A two-piece mandrel indicated generally at 145, which includes an outer hollow cylindrical mandrel portion 146 and a cylindrical inner portion 147 is inserted into recess 107 and the hollow interior 148 of sleeve 105, respectively, to prevent sleeve 105 from collapsing, when the material resin indicated at 149, flows into the mold cavity and around inner member 91 through mold gate 150. The incoming resin completely surrounds and encapsulates and traps inner member 91 within the newly formed outer member 92.

Prior to injecting the molten resin into mold cavity 141, O-rings 99 and 102 are placed in position along with metal retaining ring 110. Ring 110 forms a pocket for the O-ring and protects it from the incoming molten resin, when outer member 91 is being molded.

After plastic material 149 sufficiently hardens around inner member 91, mandrels 144 and 145 are removed, enabling the complete connector to be removed from mold 142 which then contains the two sealing O-rings and metal retaining ring trapped therein, for subsequent shipment and installation at a remote site. If desired, the molding of outer member 92 can be accomplished as discussed above and shown in FIGS. 10 and 10A, that is, with tubular member 145 being attached to the connector in the mold cavity.

Metal retaining ring 110 will enable tubular member 140 to be inserted into and automatically secured in the open end of the connector after the connector has been molded, whether tubular member 140 is metal or a synthetic plastic material. Likewise it is readily understood that inner sleeve 105, which is desirable for many applications, can be eliminated without effecting the concept of the invention. In such a modified construction, mandrel 145 will be a single piece mandrel, which will provide the necessary internal reinforcement during the molding of outer member 92.

Figure 25:
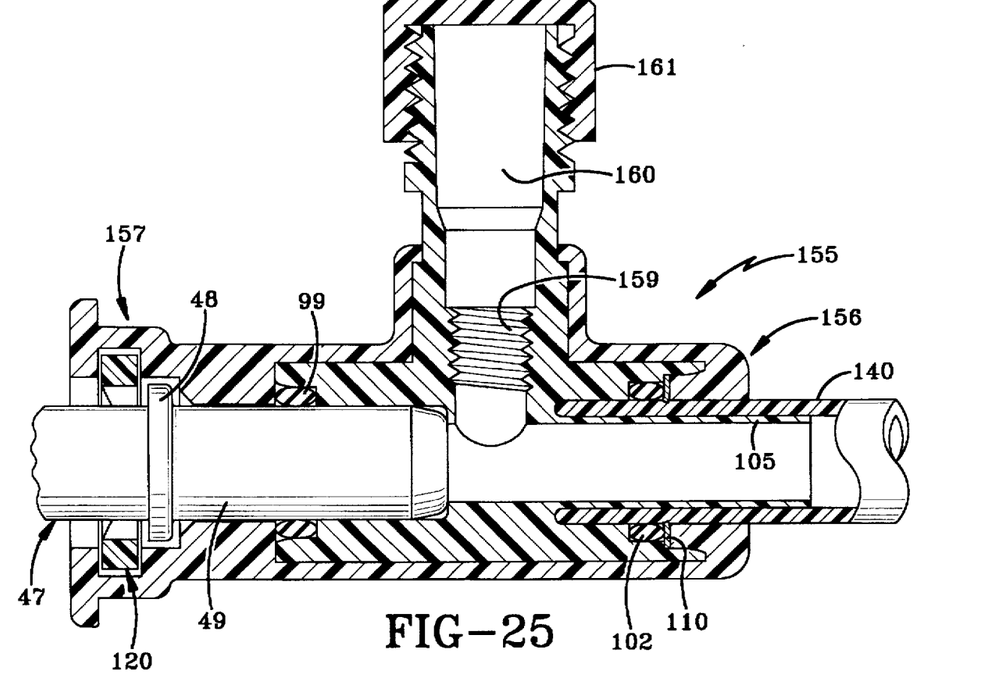
FIG. 25 is a sectional view similar to FIG. 16 showing a modified form of the connector.

Another embodiment of the improved connector of the present invention is indicated generally at 155, and is shown in FIG. 25 and is similar in many respects to embodiment 70 shown in FIG. 13, with the exception that end 156 is provided with the above discussed metal retaining ring 110 and associated O-ring 102, for securing tubular member 140 therein with a slip-fit engagement. Connector end 157 is similar to end 111 of FIG. 16 and receives and secures end 49 of tubular conduit 47 therein by the use of clip 120. Connector 155 includes a third inlet opening, which is formed by a pair of radially extending and aligned openings in the inner and outer members, which communicates with the interior bore of the connector, to provide a service port for the connector. Opening 159 may have an air valve 160 mounted therein, and may contain an end sealing cap 161 threadably engages therewith.

Figure 26:
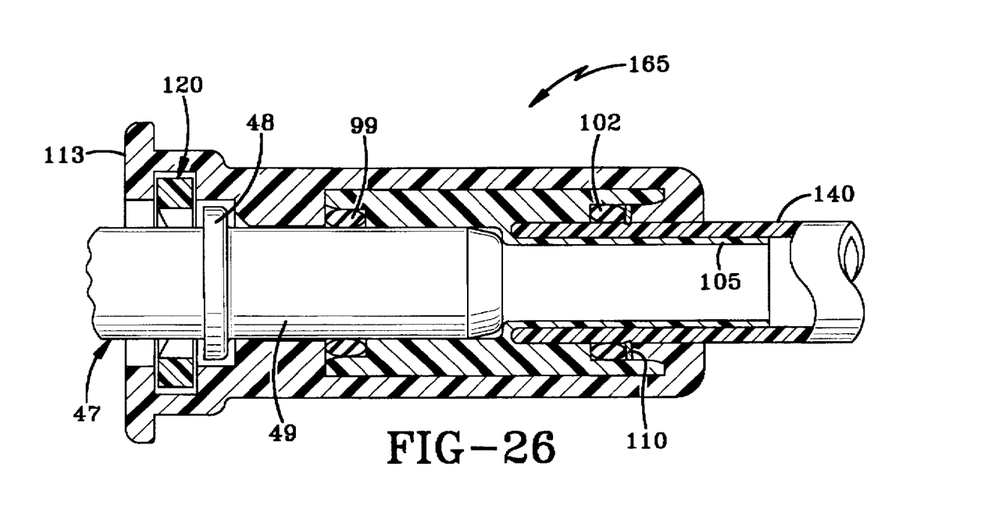
FIG. 26 is a sectional view similar to FIGS. 16 and 25 showing another embodiment of the connector of the present invention.

Another modified connector is indicated generally at 165, and is shown in FIG. 26 and is generally similar to connector 90 shown and described above, except that it is a straight connector wherein the bore extends in a linear direction completely through the connector, whereas connector 90 is a 90° elbow The ends of connector 165 are the same as that described above with respect to connector 90 for receiving and securing tubular member 140 therein by retaining ring 110, with tubular conduit 47 being retained therein, by clip 120.

It is easily seen that either end of the various connectors shown in FIGS. 16, 25 and 26 could have other types of fittings, such as a screw connection or the like, without effecting some of the main features of the invention, such as the molding of the connector as a two-piece member, with one of the members being formed of a different plastic than that of the other member to provide the resistance to the permeation of the fumes therethrough, while providing the desired physical protection in abrasion resistance as in prior plastic type connectors.

Accordingly, the connector, and connector assembly and clip of the present invention are simplified, provide an effective, safe, inexpensive, and efficient device and method which achieves all the enumerated objectives, provide for eliminating difficulties encountered with prior devices and methods, and solve problems and obtain new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved connector and connector assembly are constructed and used, the characteristics of the construction, and the advantageous, new and useful results obtained; the new and useful structures, devices, elements, arrangements, parts and combinations, and method steps, are set forth in the appended claims.

We claim:

1. A connector assembly including:

a tubular conduit having an outer end and a radially extending latching member spaced inwardly from said outer end of the conduit;

an inner member having first and second open ends and having a bore formed therein and extending between said open ends, with said first open end receiving the said outer end of the conduit therein;

first seal means disposed in the bore of the inner member for providing a seal between the outer end of said conduit and said inner member;

an outer member substantially encapsulating and surrounding the inner member, said outer member having first and second open ends which are coaxial with the first and second open ends, respectively, of the inner member, said second open ends receive an end of a tubular member therein to provide fluid communication between said tubular conduit and said tubular member through said inner and outer members;

second seal means disposed in the bore of the inner member adjacent the second open end of said inner member, for providing a seal between said inner member and the tubular member;

metal ring means disposed in the bore of the inner member adjacent the second seal means for securing an end of the tubular member within the bore of the inner member; and retainer means for cooperating with the latching member of the conduit for releasably retaining the conduit within the bore of the inner member.

2. The connector assembly defined in claim 1 in which the tubular member has at least inner and outer layers of material; and in which the said outer layer terminates before the second seal means with said inner layer extending past said second seal means and into the bore of the inner member.

3. The connector assembly defined in claim 2 in which the tubular member has inner and outer layers of material and at least one intermediate layer sandwiched therebetween; and in which the second seal means provides a seal with said intermediate layer.

4. The connector assembly defined in claim 3 in which the inner and outer layers of the tubular member are formed of Nylon and the intermediate layer is formed of a polysulfate.

5. The connector assembly defined in claim 1 in which the first and second open ends of the outer member extend beyond the first and second open ends of the inner member.

6. The connector assembly defined in claim 1 in which the first and second seal means include elastomeric O-rings.

7. The connector assembly defined in claim 1 in which the inner and outer members form a substantially 90° elbow.

8. The connector assembly defined in claim 1 in which the retainer means includes an integral one-piece plastic clip formed with an elongated opening for receiving the tubular conduit therethrough, and having a pair of flexible fingers, which engage the connector to bias the clip toward locking engagement with the conduit.

9. The connector assembly defined in claim 8 in which the elongated opening in the clip has a first curved segment which merges into a substantially circular segment which terminates into a slotted segment located diametrically opposite of said first curved segment.

10. The connector defined in claim 1 in which the inner member includes an annular sleeve extending axially within the bore of said inner member forming an annular recess between said inner member and the sleeve for receiving an end of the tubular member therein.

11. The connector defined in claim 1 in which the bore of the outer member is stepped having an enlarged portion immediately adjacent the open first end of said bore; and in which a pair of opposed apertures are formed in said outer member adjacent the enlarged bore portion.

12. The connector defined in claim 11 in which a clip having a pair of legs is slidably mounted within the opposed apertures of the outer member and engageable the latch member of the tubular conduit for retaining an end of the conduit in the connector.

13. The connector define in claim 1 in which a service port opening is formed in the inner and outer members and communicates with the bores of said inner and outer members.

14. A connector for providing a quick connection to a tubular conduit of the type having an outer end and a radially extending latching member, said connector comprising:

an inner member having first and second open ends and having a bore formed therein and extending between said open ends, said first open end being adapted to receive the outer end of the tubular conduit therein, and said second open end being adapted to receive an end of a tubular member therein;

first retainer means for cooperating with the latching member of the tubular conduit for releasably retaining said conduit within the bore of the inner member;

first seal means disposed in the bore of the inner member for providing a seal with the outer end of the tubular conduit;

an outer member substantially encapsulating and surrounding said inner member, said outer member having first and second open ends which align with the first and second open ends, respectively, of the inner member to provide fluid communication between the tubular conduit and the tubular member through said inner and outer members, said inner and outer members being formed of different plastic materials;

second seal means disposed in the bore of the inner member for providing a seal with the tubular member, when said tubular member is inserted therein; and second retainer means disposed in the bore of the inner member adjacent the second seal means for permitting insertion of the tubular member therein and for preventing subsequent removal of said tubular member therefrom, said tubular member having inner and outer layers of material and at least one intermediate layer sandwiched therebetween with said second seal means providing a seal with said intermediate layer.

15. In combination, a connector for attachment to the end of a conduit, said conduit having a radially extending latching member spaced inwardly from an outer end of said conduit, and a clip engageable with the latching member for retaining the conduit within said connector, said combination further including:

the connector being formed with a stepped bore and a pair of opposed apertures communicating with said bore;

the clip being an integral one-piece rigid plastic member having a pair of opposed ends connected by a pair of spaced sides forming an elongated opening therebetween extending between the end members, said opening including an enlarged portion sufficiently large to permit the latch member of the conduit to pass therethrough and a smaller portion which prevents passage of said latch member therethrough, a pair of curved flexible fingers extending outwardly for one of the ends and slidably engaging the connector to bias the clip toward a locked position with the conduit wherein the tubular conduit extends partially through the smaller portion of the clip opening, and a chamfered surface formed in a front surface of the sides and engageable by the outer end of the conduit to move the clip toward an unlocked position and overcome the bias of the flexible fingers to permit the passage of the end of the conduit between the sides and through the the enlarged portion after the clip has been mounted in apertures.

16. The combination defined in claim 15 in which a pair of nubs is formed on outer ends of the flexible fingers and engage outer curved surfaces of the connector for biasing the clip toward the locked position with the conduit.

17. The combination defined in claim 15 in which a flexible tab extends outwardly from an other of said ends of the clip; and in which the flexible tab engages the connector for securing the conduit within the connector.

18. The combination defined in claim 15 in which the sides of said clip have generally flat outer edges which are parallel to each other.

* * * * *